United States Patent
Dottavio et al.

(10) Patent No.: US 10,933,914 B2
(45) Date of Patent: Mar. 2, 2021

(54) TRAILER HITCHING AID

(71) Applicant: Ford Global Technologies, LLC, Dearborn, MI (US)

(72) Inventors: James Dottavio, Canton, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 16/263,847

(22) Filed: Jan. 31, 2019

(65) Prior Publication Data
US 2020/0247470 A1 Aug. 6, 2020

(51) Int. Cl.
| | |
|---|---|
| *B60D 1/36* | (2006.01) |
| *B62D 15/02* | (2006.01) |
| *B62D 13/06* | (2006.01) |
| *B60D 1/26* | (2006.01) |
| *B60D 1/06* | (2006.01) |
| *B60D 1/24* | (2006.01) |

(52) U.S. Cl.
CPC ............ *B62D 15/025* (2013.01); *B60D 1/06* (2013.01); *B60D 1/242* (2013.01); *B60D 1/26* (2013.01); *B62D 13/06* (2013.01)

(58) Field of Classification Search
CPC . B60D 1/06; B60D 1/242; B60D 1/26; B62D 13/06; B62D 15/025

USPC .......................................... 280/477; 340/431
See application file for complete search history.

(56) References Cited

U.S. PATENT DOCUMENTS

| | | |
|---|---|---|
| 5,660,409 A | 8/1997 | Hensley |
| 8,191,915 B2* | 6/2012 | Freese V ................ B60D 1/58 |
| | | 280/477 |
| 8,226,106 B2 | 7/2012 | Hensley |
| 9,102,271 B2 | 8/2015 | Trombley et al. |
| 9,889,714 B2* | 2/2018 | Bochenek ............... B60D 1/62 |
| 10,604,184 B2* | 3/2020 | Mattern ................ B62D 13/06 |
| 10,730,553 B2* | 8/2020 | Raad .................... B62D 15/024 |
| 2007/0137053 A1 | 6/2007 | Ball |
| 2016/0052548 A1* | 2/2016 | Singh ...................... B60D 1/36 |
| | | 701/37 |
| 2018/0181142 A1* | 6/2018 | Baran ...................... G01C 3/10 |
| 2018/0251153 A1* | 9/2018 | Li ........................... B60D 1/06 |
| 2018/0312022 A1 | 11/2018 | Mattern et al. |
| 2019/0092109 A1* | 3/2019 | Carpenter ............... G06N 3/08 |

* cited by examiner

*Primary Examiner* — Toan C To
(74) *Attorney, Agent, or Firm* — Raymond Coppiellie; Price Heneveld LLP (57) ABSTRACT

A vehicle system is disclosed herein. The system includes a hitch ball mounted on a vehicle. A controller is configured to identify a coupler position of a trailer and control motion of the vehicle to an aligned position, wherein the hitch ball is aligned with the coupler position. The controller is further configured to initiate a vehicle agitation routine after the vehicle has reached the aligned position.

17 Claims, 7 Drawing Sheets

TRAILER HITCHING AID

FIELD OF THE INVENTION

The present disclosure generally relates to a system for assisting in a vehicle-trailer hitching operation. In particular, the present disclosure relates to a system configured to enable a user to appropriately seat a hitch ball within a trailer coupler.

BACKGROUND OF THE INVENTION

Hitching a trailer to a vehicle can be frustrating and time-consuming. In particular, appropriately seating a vehicle hitch ball within a trailer coupler can be difficult, especially if the weight of the trailer is resting upon the hitch ball via the coupler before necessary alignment between the hitch ball and coupler is achieved. This situation often results in a user attempting to rock the trailer and/or move the vehicle in order to get the coupler to drop on to the hitch ball. This effort can be cumbersome to the user. Accordingly, further advancements that enable a vehicle hitch ball to be conveniently seated within a trailer coupler may be desired.

SUMMARY OF THE INVENTION

According to one aspect of the present disclosure, a vehicle system is disclosed. The system includes a hitch ball mounted on a vehicle. A controller is configured to identify a coupler position of a trailer and control motion of the vehicle to an aligned position, wherein the hitch ball is aligned with the coupler position. The controller is further configured to initiate a vehicle agitation routine after the vehicle has reached the aligned position.

Embodiments of the first aspect of the disclosure can include any one or a combination of the following features:
  a human-machine interface, wherein the controller is configured to initiate the vehicle agitation routine in response to at least one user input received via the human-machine interface;
  the human-machine interface is a portable device configured to communicate with the controller via wireless communication;
  the controller is further configured to control a powertrain control system of the vehicle to move the vehicle forward a predetermined distance and backward a predetermined distance, in response to initiation of the vehicle agitation routine;
  the predetermined distance of forward movement is from about 5 mm to about 100 mm;
  the predetermined distance of backward movement is from about 5 mm to about 100 mm;
  the controller is further configured to control a powertrain control system of the vehicle to move the vehicle in a series of forward and backward movements sequentially, in response to initiation of the vehicle agitation routine;
  an internal combustion engine configured to move the vehicle to the aligned position; and an electric machine configured to move the vehicle upon initiation of the vehicle agitation routine;
  a starter motor configured to start the vehicle, wherein initiation of the vehicle agitation routine prompts activation of the starter motor; and
  the controller is further configured to control a vehicle brake control system to intermittently apply a service brake to stop the forward and backward movement of the vehicle during execution of the vehicle agitation routine.

According to another aspect of the present disclosure, a method for controlling a vehicle is disclosed. The method comprises identifying a coupler position of a trailer and controlling motion of the vehicle to an aligned position, aligning a hitch ball with the coupler position. After reaching the aligned position, the method continues by controlling motion of the vehicle by performing a vehicle agitation routine in response to a human-machine interface receiving at least one user input.

Embodiments of the second aspect of the disclosure can include any one or a combination of the following steps:
  moving the vehicle forward a predetermined distance and moving the vehicle backward a predetermined distance;
  the human-machine interface is a portable device configured to communicate with the vehicle wirelessly;
  moving the vehicle in a series of forward and backward movements sequentially; and
  controlling motion of the vehicle by moving the vehicle forward a predetermined distance after a coupler of the trailer has dropped on to the hitch ball.

According to another aspect of the present disclosure, a vehicle system is disclosed. The vehicle system includes a hitch ball mounted on a vehicle. The vehicle system further includes a human-machine interface. A controller is electrically coupled to the human-machine interface and is configured to initiate a vehicle agitation routine in response to at least one user input received via the human-machine interface, wherein initiation of the vehicle agitation routine prompts the vehicle to move in a series of forward and backward movements sequentially.

Embodiments of the third aspect of the disclosure can include any one or a combination of the following features:
  the forward movements are of a predetermined distance from about 5 mm to about 100 mm;
  the backward movements are of a predetermined distance from about 5 mm to about 100 mm;
  the forward movements are of a predetermined distance from about 10 mm to about 40 mm;
  the backward movements are of a predetermined distance from about 10 mm to about 40 mm; and These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
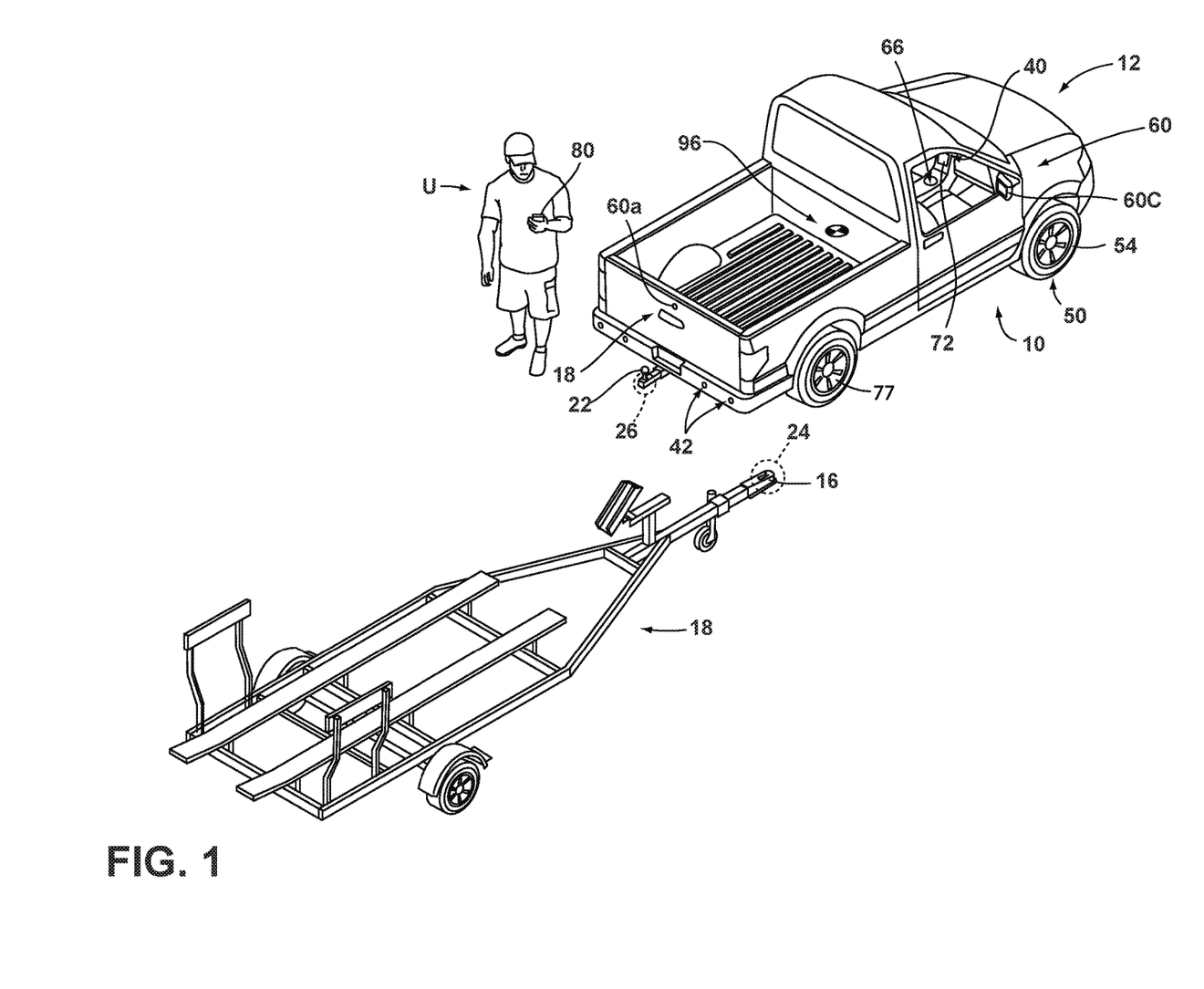
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the hitch assist system 10 may be configured to control the vehicle 12 to initiate an automated vehicle stop routine. The controller 14 may apply the vehicle stop routine to stop the vehicle 12 and position the hitch ball 22 in alignment with the coupler 16. For example, during a guided or automated operation of the vehicle 12, the controller 14 may control the motion of the vehicle 12 along the vehicle path 20 such that the hitch ball 22 of the vehicle 12 is aligned with the coupler 16. The vehicle 12 may be halted in the aligned position, such that the hitch ball 22 is proximate to the coupler 16, which may enable the user U to conveniently drop the coupler 16 on to the hitch ball 22. However, various factors may contribute to disrupting the alignment between the hitch ball 22 and the coupler 16, such that when the coupler 16 is dropped on to the hitch ball 22, the hitch ball 22 does not appropriately seat itself within the coupler 16. Accordingly, the system 10 may be configured to apply a vehicle agitation routine 30, which may aid the user U in dropping the coupler 16 on to the hitch ball 22. A detailed description of the vehicle agitation routine 30 is further discussed in reference to FIGS. 5-6A.

Figure 2:
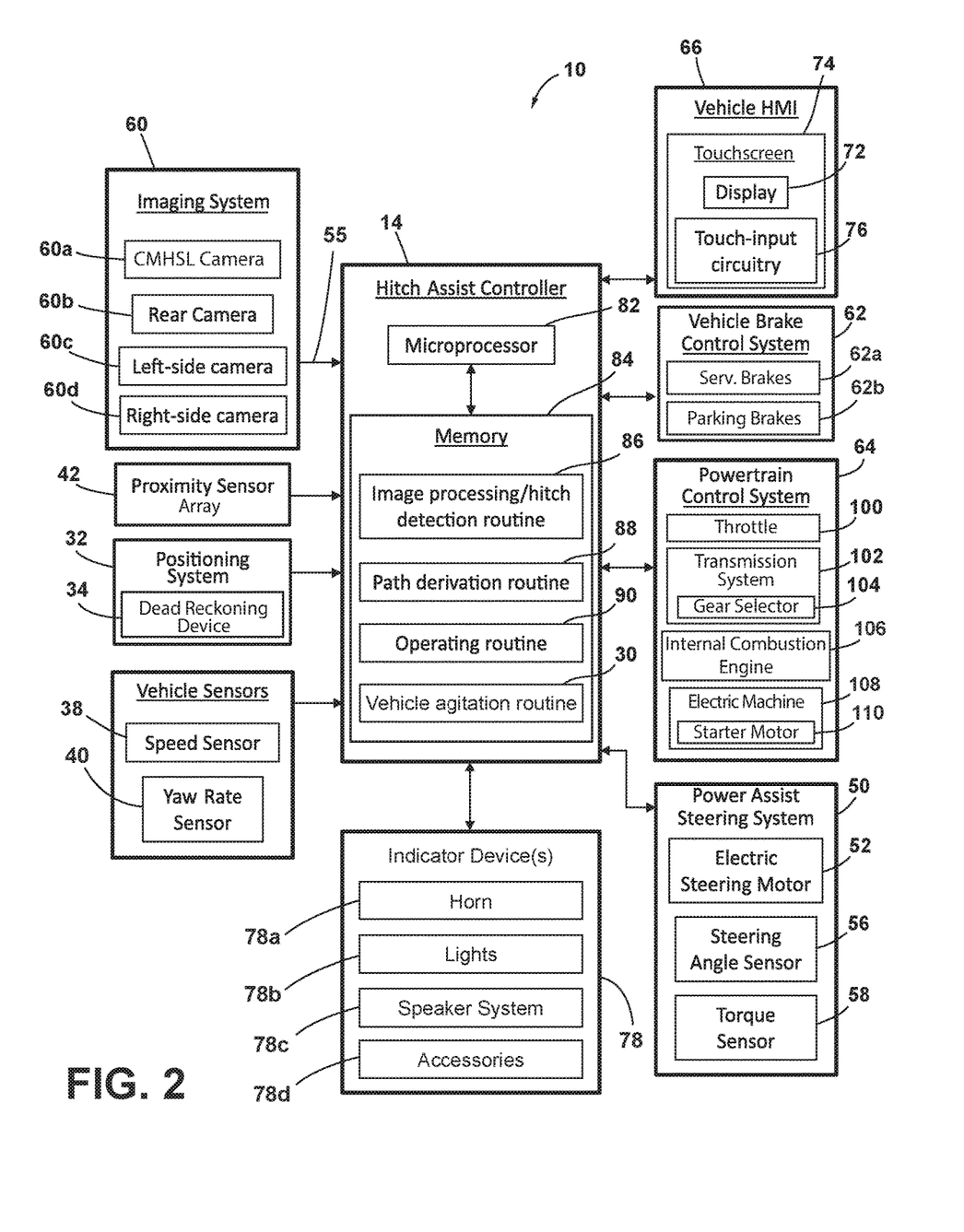
FIG. 2 is a diagram of a system according to an aspect of the disclosure for assisting in aligning the vehicle with the trailer in a position for hitching the trailer to the vehicle.
Figure 3:
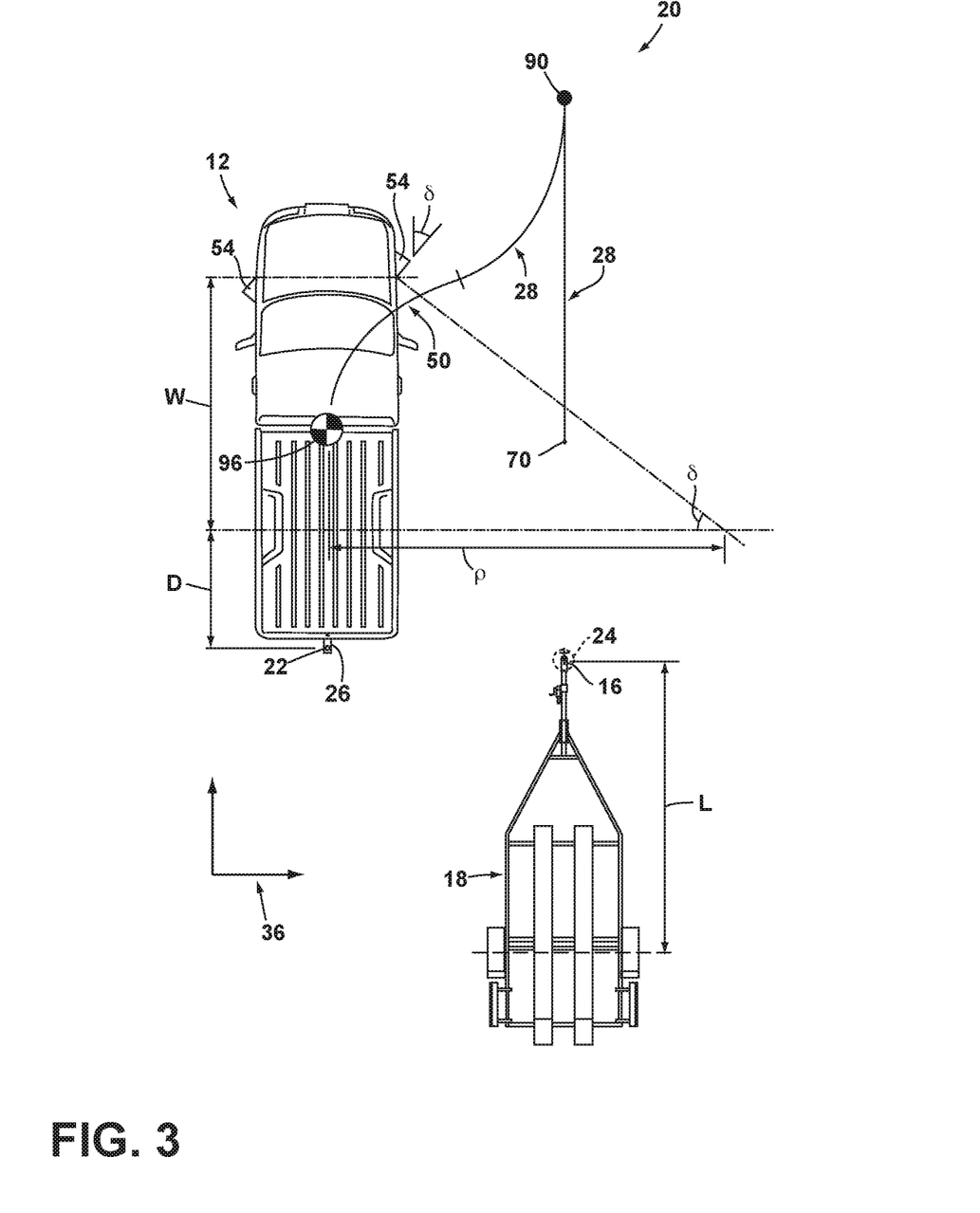
FIG. 3 is an overhead schematic view of the vehicle during a step of the alignment with the trailer.
Figure 4:
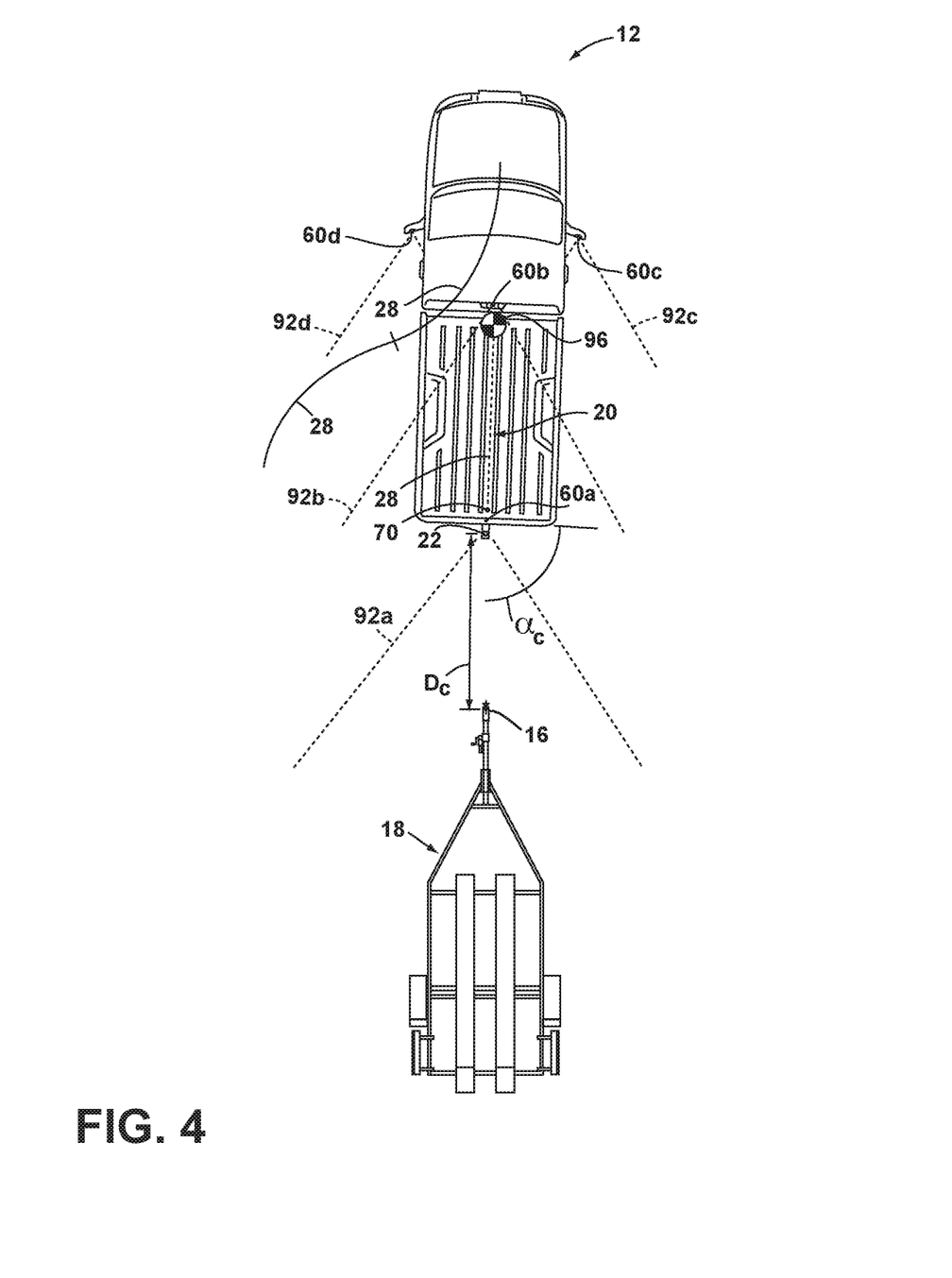
FIG. 4 is an overhead schematic view of the vehicle during a step of the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. As mentioned above, regulation of the speed of the vehicle 12 may be advantageous to prevent collision with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen and/or other circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, an operating routine 90, and the vehicle agitation routine 30.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in co-pending, commonly-assigned U.S. patent application Ser. No. 15/583,014, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information can then be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle δ can be used to determine a corresponding turning radius ρ for vehicle 12 according to the equation:

$$\rho = \frac{1}{W \tan \delta},\quad (1)$$

in which the wheelbase W is fixed and the steering angle δ can be controlled by controller 14 by communication with steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}.\quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 reach an aligned position, wherein the hitch ball 22 is aligned with coupler 16 and/or the coupler position 24.

Figure 5:
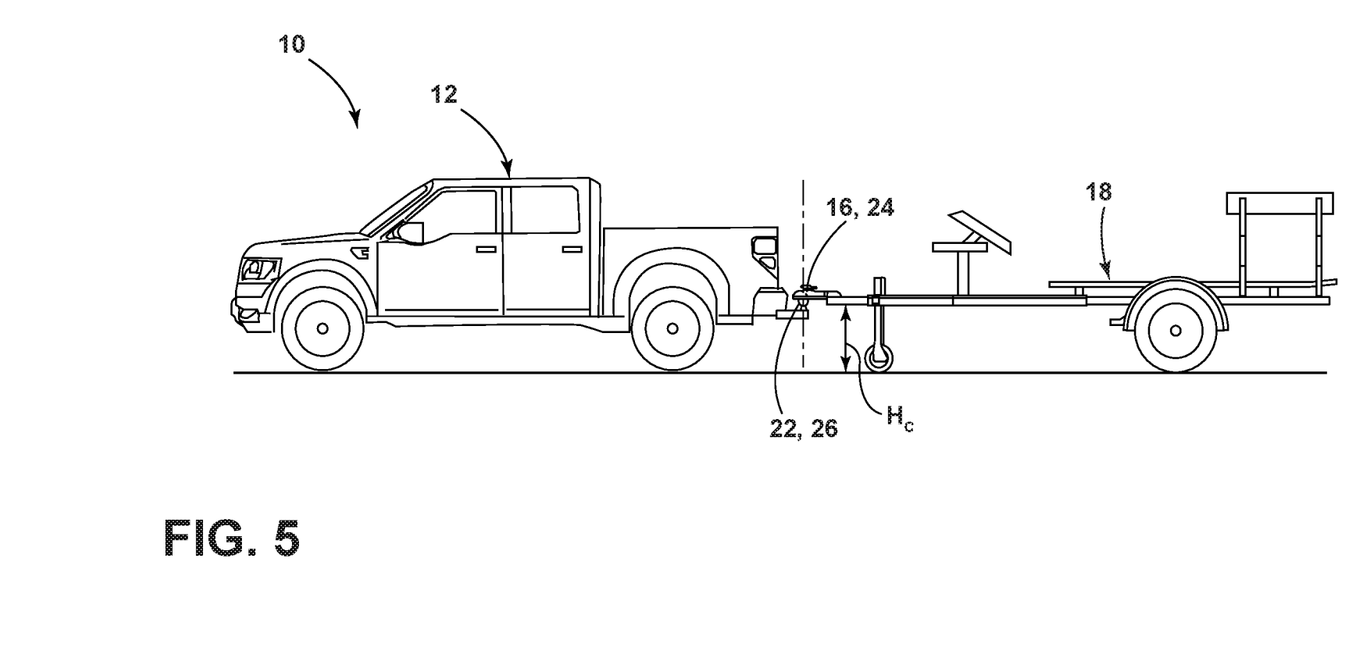
FIG. 5 is a side view of a vehicle aligned with the trailer illustrating a hitch ball of the vehicle in contact with but not seated within a coupler of the trailer.

Referring now to FIG. 5, a side profile view of the vehicle 12 in connection with the trailer 18 is shown demonstrating the hitch ball 22 of the vehicle 12 in abutment with but not properly seated within the coupler 16 of the trailer 18. In some instances, a portion of the weight of the trailer 18 may be resting upon the hitch ball 22 of the vehicle 12 via the coupler 16, despite the hitch ball 22 not being seated within the coupler 16. This weight may cause significant friction between the hitch ball 22 and the coupler 16, which may hinder corrective adjustment of the coupler 16 relative to the hitch ball 22 by the user U. In order to aid the user U in making corrective adjustments of the hitch ball 22 relative to the coupler 16 in such circumstances, the controller 14 may be configured to control the powertrain control system 64, the brake control system 62, and/or various other systems to perform the vehicle agitation routine 30.

Figure 6A:
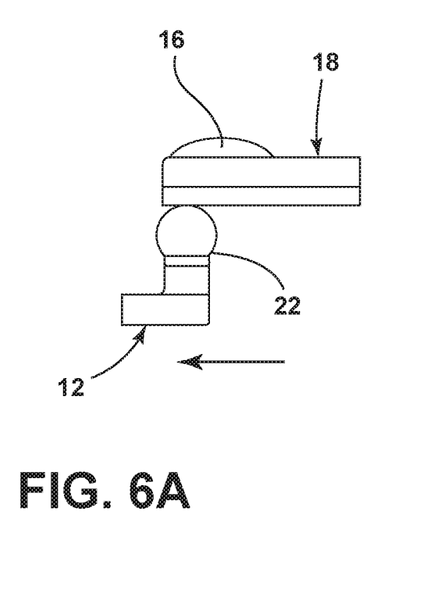
FIG. 6A is a side view of the hitch ball in un-seated contact with the coupler, illustrating forward movement of the vehicle and hitch ball during execution of the vehicle agitation routine.
Figure 6B:
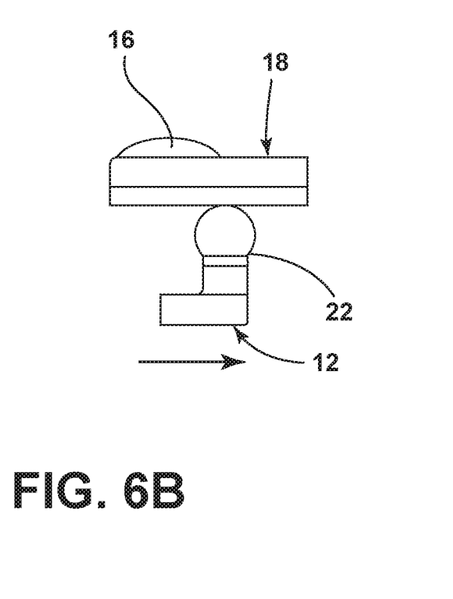
FIG. 6B is a side view of the hitch ball in un-seated contact with the coupler, illustrating backward movement of the vehicle and hitch ball during execution of the vehicle agitation routine.
Figure 6C:
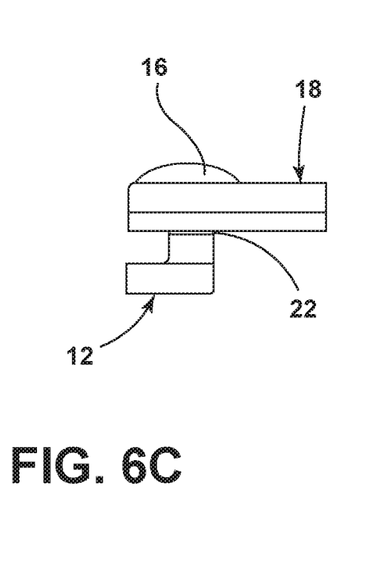
FIG. 6C is a side view of the hitch ball of the vehicle seated within the coupler of the trailer.

Referring now to FIGS. 5-6C, in various embodiments, performance of the vehicle agitation routine 30 may include the controller 14 controlling the powertrain control system 64 to cause forward and/or backward movement of the vehicle 12. In some embodiments, the vehicle agitation routine 30 may include a series of forward and/or backward movements that are executed sequentially. For example, in some embodiments, performance of the vehicle agitation routine 30 may include a forward movement of the vehicle 12, followed by a backward movement of the vehicle 12, followed by another forward movement of the vehicle 12, and then another backward movement of the vehicle 12. The forward movement and the backward movement are denoted with arrows in FIGS. 6A and 6B.

In various embodiments, the controller 14 may be configured to control the brake control system 62 to accomplish the vehicle agitation routine 30. For example, in some embodiments, the controller 14 may be configured to control the brake control system 62 such that service brakes 62a are applied intermittently to stop the forward and/or rearward movement of the vehicle 12 during the vehicle agitation routine 30.

In various embodiments, the controller 14 may be configured to control the powertrain control system 64, the brake control system 62, and/or other systems such that initiation of the vehicle agitation routine 30 may cause the vehicle 12 to move forward a predetermined distance and/or backward a predetermined distance. In some embodiments, the predetermined distance of forward and/or backward movement of the vehicle 12 may be from about 5 mm to about 100 mm. In some embodiments, the predetermined distance of forward and/or backward movement of the vehicle 12 may be from about 10 mm to about 40 mm. In some embodiments, the predetermined distance of forward and/or backward movement of the vehicle 12 may be from about 15 mm to about 30 mm. In some embodiments, the predetermined distance of forward and/or backward movement of the vehicle 12 may be about 20 mm. It is contemplated that the predetermined distance of forward and/or backward movement of the vehicle 12 during the vehicle agitation routine 30 may be at least one of a variety of distances. Further, it is contemplated that, in some embodiments, the predetermined distance of forward movement may differ from the predetermined distance of backward movement.

In some embodiments, the controller 14 may be configured to execute the vehicle agitation routine 30 for a limited duration, such that the vehicle 12 may move backward and forward for a given duration. For example, in some embodiments, the controller 14 may be configured to execute the vehicle agitation routine 30 for a duration from about 1 second to about 30 seconds. In some embodiments, the vehicle agitation routine 30 may be executed for a duration from about 1 second to about 15 seconds. In some embodiments, the vehicle agitation routine 30 may be executed for a duration from about 1 second to about 5 seconds. It is contemplated, as will be discussed below, that the duration that the controller 14 executes the vehicle agitation routine 30 may be subject to an input received by the controller 14 (e.g., user inputs, input from vehicle sensors and/or devices, etc.).

In various embodiments, the controller 14 may initiate the vehicle agitation routine 30 in response to at least one input. In some embodiments, the controller 14 may initiate the vehicle agitation routine 30 in response to at least one user input received via the HMI 66. For example, the vehicle agitation routine 30 may be initiated by the user U entering at least one user input into the touchscreen 74 HMI 66 coupled to the vehicle 12. As discussed above, in some embodiments, the HMI 66 may include the portable device 80. Accordingly, in some embodiments, the vehicle agitation routine 30 may be initiated by the user U entering at least one user input into the portable device 80 HMI 66, such as a cellular phone. In various embodiments, the vehicle agitation routine 30 may be initiated after the vehicle 12 has reached the aligned position. For example, in some embodiments, the controller 14 may be configured to initiate a vehicle agitation routine 30 after the vehicle 12 has reached the aligned position.

In some embodiments, the controller 14 may initiate the vehicle agitation routine 30 in response to the detection of various environmental factors. For example, in some embodiments, the controller 14 may initiate the vehicle agitation routine 30 in response to sensors and/or devices of the vehicle 12 determining that the coupler 16 of the trailer 18 is in abutment with and/or resting upon the hitch ball 22 of the vehicle 12, but the hitch ball 22 is not seated within the coupler 16. The sensors and/or devices of the vehicle 12 may determine that the hitch ball 22 is positioned in such a way relative to the coupler 16 in at least one of a variety of manners including, but not limited to, utilizing image data of the hitch ball 22 and/or coupler 16, sensing the proximity of the hitch ball 22 relative to the coupler 16, sensing the weight of the trailer 18 upon the hitch ball 22, and/or a combination thereof. In various embodiments, the image data may be derived from various devices, such as a camera, the proximity of the hitch ball 22 relative to the coupler 16 may be sensed by the proximity sensor 42, and the weight of the trailer 18 may be sensed via a weight sensor. Initiation of the vehicle agitation routine 30 in response to such environmental factors may be particularly useful in vehicles 12 that adjust the height of the hitch ball 22 via changes in the vehicle 12 suspension autonomously, as the hitch ball 22 of the vehicle 12 would, theoretically, be in contact with the coupler 16 upon completion of the autonomous hitching maneuver.

In various embodiments, the controller 14 may terminate the vehicle agitation routine 30 in response to at least one input. In some embodiments, the controller may terminate the vehicle agitation routine 30 in response to at least one user input received from the HMI 66. It is contemplated that the HMI 66 may be coupled to the vehicle 12 or may be the portable device 80. In some embodiments, the controller 14 may terminate the vehicle agitation routine 30 in response to certain environmental factors. For example, the controller 14 may terminate the agitation routine 91 in response to sensors and/or devices of the vehicle 12 detecting the user U in the vicinity of the hitch ball 22. For example, in some embodiments, the controller 14 may terminate the vehicle agitation routine 30 in response to a sensor detecting an object within a distance of two feet from the hitch ball 22.

In various embodiments, the controller 14 may prevent initiation of the vehicle agitation routine 30 in response to certain environmental factors. For example, in some embodiments, the controller 14 may prevent initiation of the vehicle agitation routine 30 if the vehicle 12 is not in a given gear. In some embodiments, the controller 14 may prevent initiation of the vehicle agitation routine 30 if the user U or other object is detected within the vicinity of the hitch ball 22. In some embodiments, the user U or other object may be detected by utilizing image data through the imaging system 68.

Referring now to FIG. 2, in various embodiments, the vehicle 12 may include an internal combustion engine 106. In various embodiments, the controller 14 may control the internal combustion engine 106 via the powertrain control system 64 such that internal combustion engine 106 moves the vehicle 12 to the aligned position. In some embodiments, the controller 14 may control the internal combustion engine 106 via the powertrain control system 64 such that internal combustion engine 106 carries out the vehicle agitation routine 30. In some embodiments, the vehicle agitation routine 30 may be performed via the operation of an electric machine 108 of the vehicle 12 (e.g., electric motor), as directed by the controller 14. In some embodiments, the vehicle agitation routine 30 may be performed at the direction of the controller 14 via the operation of a "P0" electric machine 108 (e.g., the electric machine 108 is connected within the internal combustion engine 106 through a belt, on the front end accessory drive). In some embodiments, the vehicle agitation routine 30 may be performed at the direction of the controller 14 via operation of a "P1" electric machine 108 (e.g., the electric machine 108 is connected directly with the crankshaft of the internal combustion engine 106). It is contemplated that, in various embodiments, the vehicle agitation routine 30 may be performed at the direction of the controller 14 via operation of at least one of a variety of tractive electric machines 108 included within the vehicle 12. For example, in some embodiments, a starter motor 110 configured to start the vehicle 12 may be utilized to perform the vehicle agitation routine 30. As such, in some embodiments, initiation of the vehicle agitation routine 30 by the controller 14 may prompt activation of the starter motor 110.

Referring further to FIGS. 5-6C, in operation, the user U may initiate the vehicle agitation routine 30 when the hitch ball 22 of the vehicle 12 is in abutment with, but not properly seated within, the coupler 16 of the trailer 18, as shown in FIG. 5. Upon initiation of the vehicle agitation routine 30, the vehicle 12 may move forward, as shown in FIG. 6A, and backward, as shown in FIG. 6B, sequentially, as discussed above. The forward and backward movement of the vehicle 12 during the execution of the vehicle agitation routine 30 may cause the hitch ball 22 to move relative to the coupler 16, as shown in FIGS. 6A and 6B, which may result in the coupler 16 dropping on to the hitch ball 22, such that the hitch ball 22 is seated within the coupler 16, as depicted in FIG. 6C.

It is contemplated that, in some embodiments, when the hitch ball 22 drops on to the coupler 16, the coupler 16 may not latch correctly due to the position of the hitch ball 22 within the coupler 16. For example, in some embodiments, the coupler 16 may include a latch feature that will only lock into place when the hitch ball 22 is pressed against the front inside of the coupler 16. Accordingly, in some embodiments, the controller 14 may be configured to control motion of the vehicle 12 such that the vehicle 12 moves forward a predetermined distance after the coupler 16 has dropped on to the hitch ball 22. In this way, the hitch ball 22 may be appropriately pressed against the front inside of the coupler 16, such that the coupler 16 may latch correctly without interference.

In various embodiments, the predetermined distance of forward movement of the vehicle 12 after the coupler 16 has dropped on to the hitch ball 22 may be from about 10 mm to about 200 mm. In some embodiments, the predetermined distance of forward movement of the vehicle 12 after the coupler 16 has dropped on to the hitch ball 22 may be from about 35 mm to about 140 mm. In some embodiments, the predetermined distance of forward movement of the vehicle 12 after the coupler 16 has dropped on to the hitch ball 22 may be from about 50 mm to about 90 mm. In some embodiments, the predetermined distance of forward movement of the vehicle 12 after the coupler 16 has dropped on to the hitch ball 22 may be about 70 mm. It is contemplated that the predetermined distance of forward movement of the vehicle 12 after the coupler 16 has dropped on to the hitch ball 22 may be a variety of distances.

Figure 7:
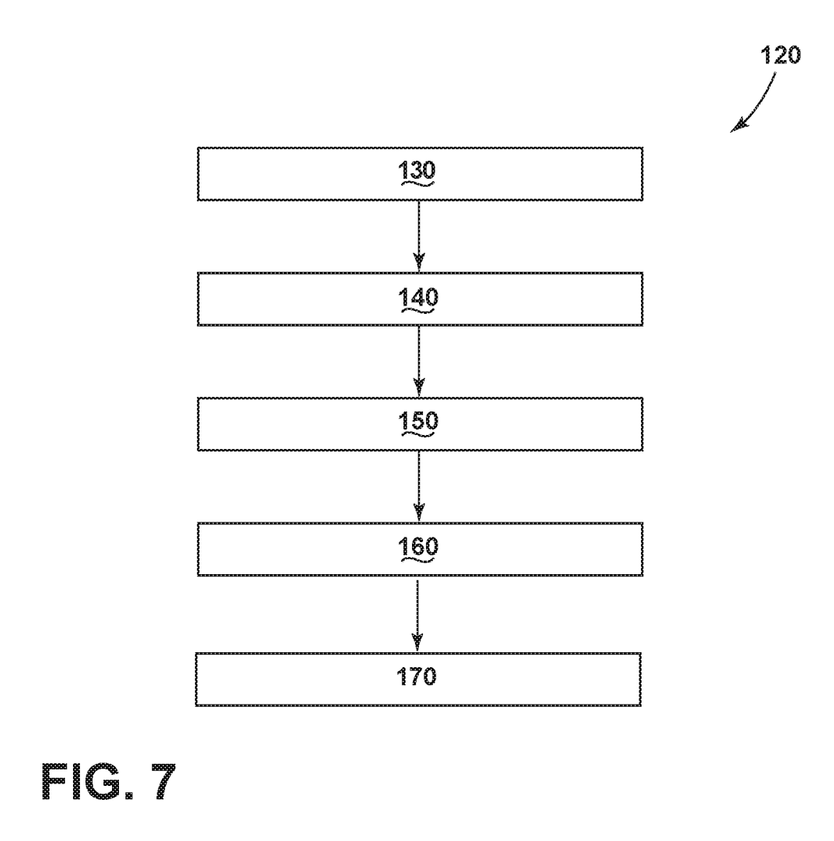
FIG. 7 is a block diagram illustrating the steps of a method of controlling a vehicle.

Referring now to FIG. 7, a block diagram demonstrating a method 120 for controlling the vehicle 12 is depicted. The method 120 includes the step 130 of identifying the coupler position 24 of the trailer 18. In various embodiments, identifying the coupler position 24 may be accomplished by the controller 14 via the image processing routine 86. In some embodiments, the image processing routine 86 may identify the coupler 16 within the image data based on stored or otherwise known visual characteristics of coupler 16 or hitches in general. In some embodiments, the image processing routine 86 may be programmed with identifying characteristics of one or more markers for location in image data, as well as the positioning of the coupler 16 relative to the one or more markers so that the coupler position 24 can be determined based on the one or more markers location.

In some embodiments, the controller 14 may seek confirmation of the determined coupler 16 and/or allow user-adjustment of the coupler position 24, via a prompt on the HMI 66. For example, the controller 14 may seek confirmation of the determined coupler 16, via a prompt on touchscreen 74. In some embodiments, the user U can visually determine the coupler position 24 within an image presented on the HMI 66 and can provide a corresponding touch input. The image processing routine 86 may then correlate the location of the touch input with the coordinate system 36 applied to image data shown on the display 72 of the HMI 66, which may be depicted as shown in FIG. 3. In some embodiments, the method step 130 of identifying the coupler position 24 may be accomplished by the user U manually. For example, the user U may identify the position 24 of the coupler 16 within an image presented on HMI 66. Further, in some embodiments, the user U may visually identify the coupler position 24 directly.

The method 120 depicted in FIG. 7 may further include the step 140 of controlling motion of the vehicle 12 to the aligned position. In various embodiments, the step 140 of controlling motion of the vehicle 12 to the aligned position may begin by initiation of a hitch connection routine. The hitch connection routine may begin by receiving scanning data (e.g., image data from the imaging system 60). From the image data, the controller 14 may identify the coupler position 24 in the image data. If the coupler position 24 is identified, the controller 14 may continue by estimating the vehicle path 20 based on the coupler position 24 and the dynamics of the vehicle 12. If the coupler position 24 is not identified, the controller 14 may again scan the image data to identify the coupler position 24.

Once the controller 14 has identified the vehicle path 20, the controller 14 may navigate the vehicle 12, more specifically the hitch ball 22, toward the coupler 16 while monitoring the coupler distance $D_c$. In response to the coupler distance $D_c$ being less than an approach threshold $D_a$, the controller 14 may control the vehicle 12 to decrease speed during a final approach stage of the hitch connection routine. The approach threshold $D_a$ may correspond to a predetermined distance wherein the hitch position 26 is proximate to the coupler position 24 as identified by the controller 14. Additionally, the controller 14 may determine if the vehicle path 20 is complete thereby aligning the hitch position 26 with the coupler position 24. If the hitch ball 22 is aligned with the coupler 16, the controller 14 may halt the vehicle 12. For example, in some embodiments, the service brakes 62a may be activated in response to the vehicle 12 reaching the aligned position. If the hitch ball 22 is not aligned with the coupler 16, the controller 14 may continue navigating the vehicle 12, as described above. It is contemplated that, in some embodiments, the step 140 of controlling motion of the vehicle 12 to the aligned position may be accomplished in a variety of ways, such as additional and/or alternative methods of autonomous alignment of the vehicle 12, manual alignment of the vehicle 12 by the user U, and/or a combination thereof.

The method 120 depicted in FIG. 7, may further include the step 150 of receiving at least one input. In various embodiments, the step 150 of receiving at least one input may include receiving at least one user input via the HMI 66. In some examples, the at least one user input may be received via the vehicle 12 HMI 66, such as the touchscreen 74. In some examples, the at least one user input may be received via the portable device 80 HMI 66, such as a cellular phone. In some embodiments, the step 150 of receiving at least one input may include receiving at least one input from sensors and/or devices of the vehicle 12 via the controller 14. It is contemplated that, in various embodiments, the step 150 of receiving at least one input may include receiving at least one input from sensors and/or devices of the vehicle 12 via the controller 14, receiving at least one user input via the HMI 66, and/or a combination thereof.

The method 120 of FIG. 7, may further include the step 160 of controlling motion of the vehicle 12 by performing the vehicle agitation routine 30. In various embodiments, the step 160 of controlling motion of the vehicle 12 by performing the vehicle agitation routine 30 may include forward and/or backward movement of the vehicle 12. In some embodiments, the step 160 may include moving the vehicle 12 forward a predetermined distance and/or moving the vehicle 12 backward a predetermined distance. In some embodiments, the step 160 may include moving the vehicle 12 in a series of forward and/or backward movements sequentially.

In various embodiments, the step 160 of controlling motion of the vehicle 12 by performing the vehicle agitation routine 30 may be initiated in response to receiving at least one input. For example, in some embodiments, the step 160 may be initiated by the controller 14 in response to the HMI 66 receiving at least one user input. In some examples, the step 160 may be initiated by the controller 14 in response to the portable device 80 that is configured to communicate wirelessly with the vehicle 12 receiving at least one user input.

In some embodiments, the method 120 of FIG. 7, may further include the step 170 of controlling motion of the vehicle 12 by moving the vehicle 12 forward a predetermined distance after the coupler 16 has dropped on to the hitch ball 22. In some embodiments, the step 170 may be initiated in response to the coupler 16 dropping on to the hitch ball 22. In some embodiments, the step 170 may be initiated in response to the termination of the vehicle agitation routine 30.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle system, comprising:
   a hitch ball mounted on a vehicle,
   an electric machine operable to move the vehicle to perform a vehicle agitation routine; and
   a controller configured to:
   identify a coupler position of a trailer;
   control motion of the vehicle to an aligned position, wherein the hitch ball is aligned with the coupler position; and
   initiate the vehicle agitation routine, after the vehicle has reached the aligned position.

2. The system according to claim 1, further comprising:
   a human-machine interface, wherein the controller is configured to initiate the vehicle agitation routine in response to at least one user input received via the human-machine interface.

3. The system according to claim 2, wherein the human-machine interface is a portable device configured to communicate with the controller via wireless communication.

4. The system according to claim 1, wherein the controller is further configured to control a powertrain control system of the vehicle to move the vehicle forward a predetermined distance and backward a predetermined distance, in response to initiation of the vehicle agitation routine.

5. The system according to claim 4, wherein the predetermined distance of forward movement is from about 5 mm to about 100 mm.

6. The system according to claim 5, wherein the predetermined distance of backward movement is from about 5 mm to about 100 mm.

7. The system according to claim 1, wherein the controller is further configured to control a powertrain control system of the vehicle to move the vehicle in a series of forward and backward movements sequentially, in response to initiation of the vehicle agitation routine.

8. The system according to claim 1, further comprising:
   an internal combustion engine configured to move the vehicle to the aligned position.

9. The system according to claim 1, wherein the electric machine comprises:
   a starter motor configured to start the vehicle, wherein initiation of the vehicle agitation routine prompts activation of the starter motor.

10. The system according to claim 7, wherein the controller is further configured to control a vehicle brake control system to intermittently apply a service brake to stop the forward and backward movement of the vehicle during execution of the vehicle agitation routine.

11. A method for controlling a vehicle comprising:
    identifying a coupler position of a trailer;
    controlling motion of the vehicle to an aligned position aligning a hitch ball with the coupler position; and
    after reaching the aligned position, controlling motion of the vehicle by performing a vehicle agitation routine in response to a human-machine interface receiving at least one user input, wherein controlling motion of the vehicle by performing the vehicle agitation routine comprises moving the vehicle a predetermined distance from about 5 mm to about 100 mm in at least one of a forward direction and a backwards direction.

12. The method according to claim 11, wherein the human-machine interface is a portable device configured to communicate with the vehicle wirelessly.

13. The method according to claim 11, wherein the step of controlling motion of the vehicle by performing a vehicle agitation routine comprises moving the vehicle in a series of forward and backward movements sequentially.

14. The method according to claim 11, further comprising the step of controlling motion of the vehicle by moving the vehicle forward a predetermined distance after a coupler of the trailer has dropped on to the hitch ball.

15. A vehicle system, comprising:
    a hitch ball mounted on a vehicle;
    a human-machine interface; and
    a controller electrically coupled to the human-machine interface and configured to initiate a vehicle agitation routine in response to at least one user input received via the human-machine interface, wherein initiation of the vehicle agitation routine prompts the vehicle to move in a series of forward and backward movements sequentially, and wherein each of the forward and rearward movements ranges in distance from about 5 mm to about 100 mm.

16. The vehicle system according to claim 15, wherein the forward movements are of a predetermined distance from about 10 mm to about 40 mm.

17. The vehicle system according to claim 16, wherein the backward movements are of a predetermined distance from about 10 mm to about 40 mm.

* * * * *